United States Patent [19]

Spatz

[11] 4,243,159
[45] * Jan. 6, 1981

[54] PUMP DEVICES FOR DISPENSING FLUIDS

[75] Inventor: Walter B. Spatz, Pacific Palisades, Calif.

[73] Assignee: Spatz Corporation, Los Angeles, Calif.

[*] Notice: The portion of the term of this patent subsequent to May 22, 1996, has been disclaimed.

[21] Appl. No.: 13,878

[22] Filed: Feb. 22, 1979

[51] Int. Cl.$^3$ .......................... B67D 1/08; B67D 5/40
[52] U.S. Cl. .................................... 222/188; 222/321; 222/340; 222/381; 222/380
[58] Field of Search ...................... 239/329, 331, 333; 417/566, 561; 222/321, 340, 380, 381, 383, 385, 188, 179.5

[56] References Cited

U.S. PATENT DOCUMENTS

| | | | |
|---|---|---|---|
| 1,730,684 | 10/1929 | Phillips | 222/321 |
| 3,282,472 | 11/1966 | Roder | 222/380 |
| 3,596,808 | 8/1971 | Corsette | 222/385 |
| 4,155,485 | 5/1979 | Spatz | 222/179.5 |
| 4,161,288 | 7/1979 | McKinney | 222/380 |

Primary Examiner—H. Grant Skaggs
Attorney, Agent, or Firm—Subkow and Kriegel

[57] ABSTRACT

A spring actuated pump device is mounted on a container for fluids, the device including a pump chamber into which fluid from the container can flow, the spring expanding and forcing a cylinder structure against the fluid in the chamber to pressurize it, in order that opening of a discharge valve will effect spraying of a desired quantity of fluid from the device, a suitable nut being threadedly connected to the cylinder structure to enable such structure to be shifted axially, in response to rotation of the nut relative to the container and cylinder structure, to compress the spring and store additional fluid pressure energy therein. A check valve permits ambient air to enter the container to prevent a vacuum condition from developing therein as fluid is withdrawn therefrom. Moreover, fluid is prevented from dribbling from the discharge valve of the device as the spring nears the end of its expansion range. Additionally, fluid leakage between a piston and supporting housing for the pump, along which the cylinder structure is slidable, is prevented by the action of pressure in the pump chamber forcing the piston more firmly into sealing relation to the housing.

14 Claims, 14 Drawing Figures

U.S. Patent   Jan. 6, 1981   Sheet 1 of 6   4,243,159
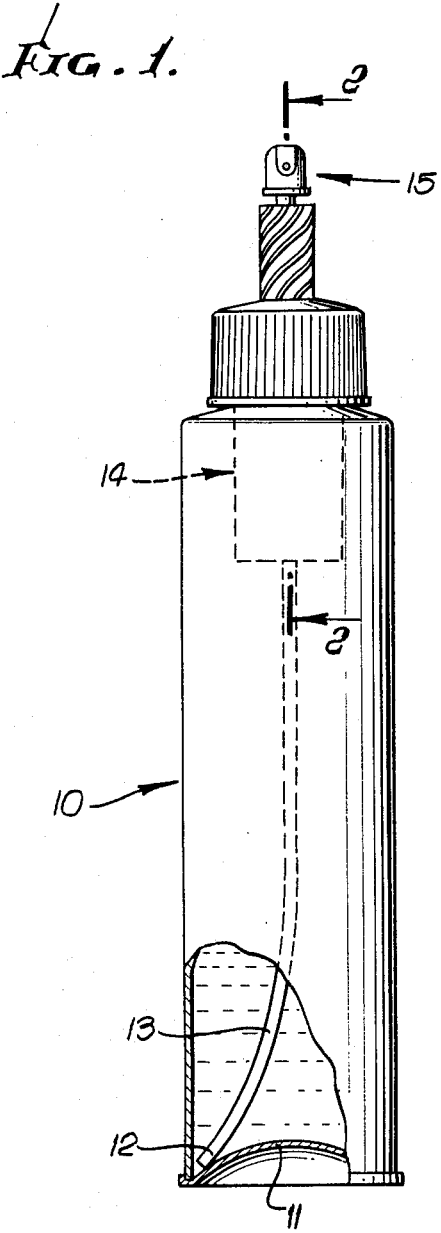
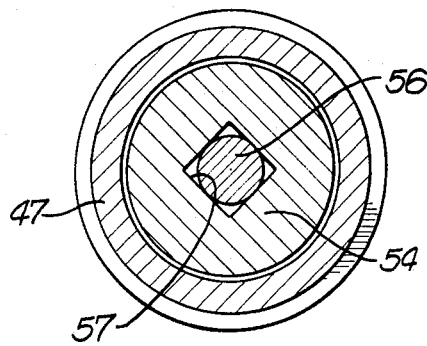
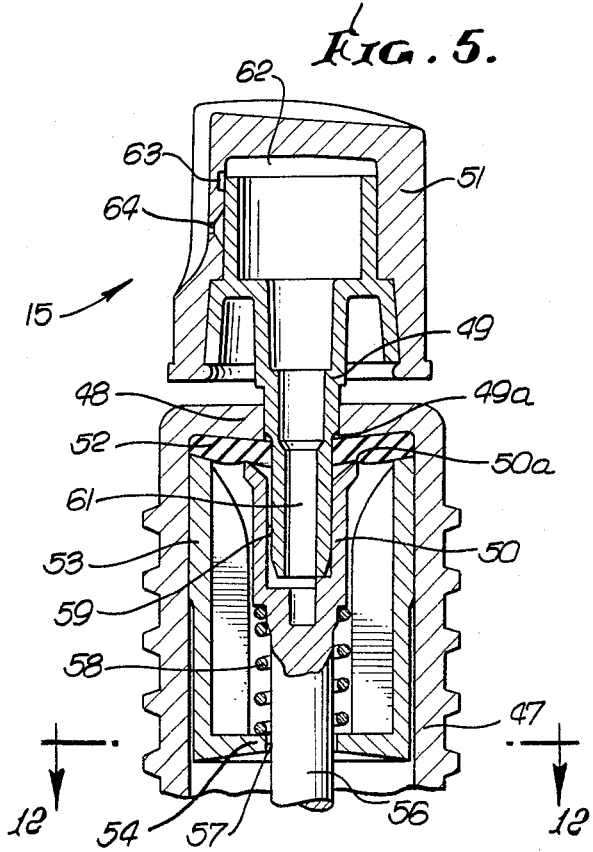
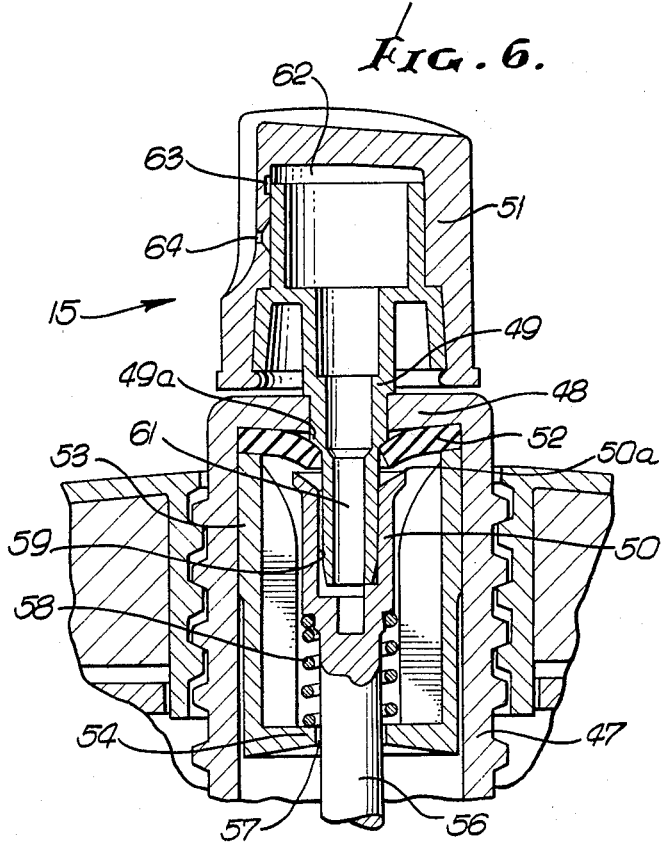

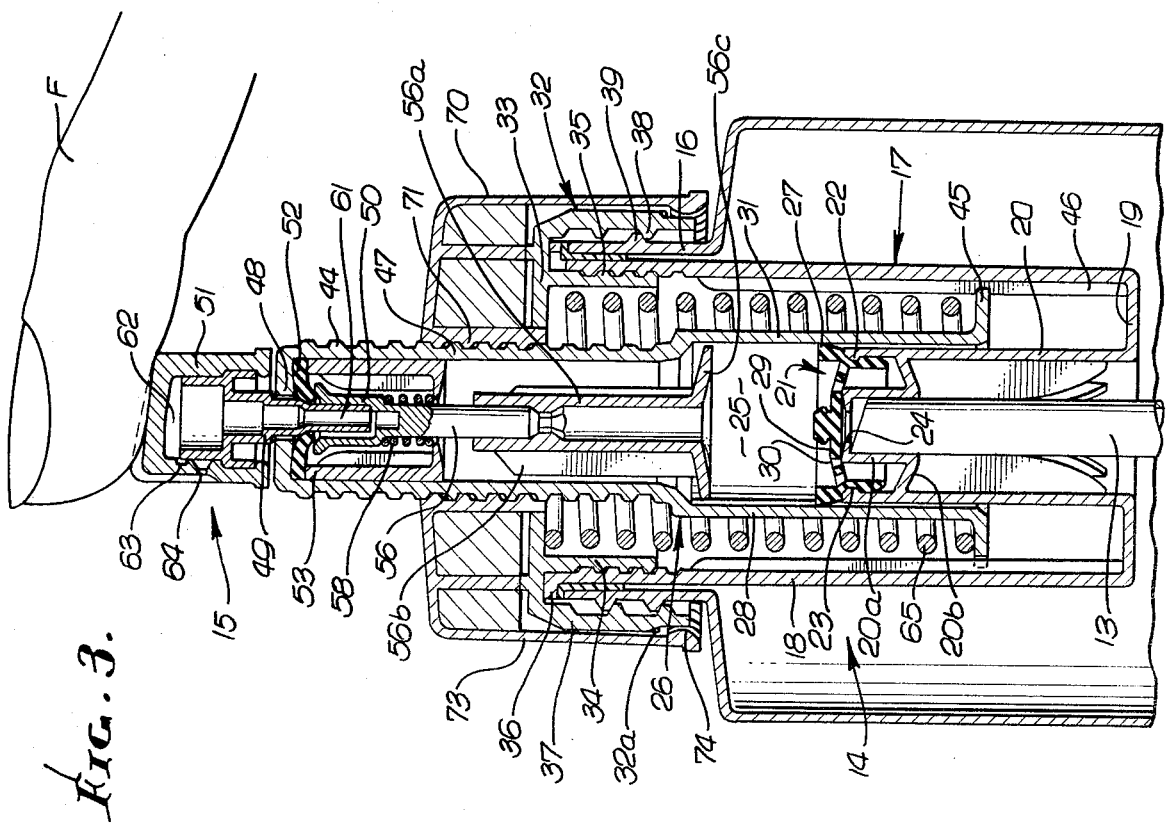
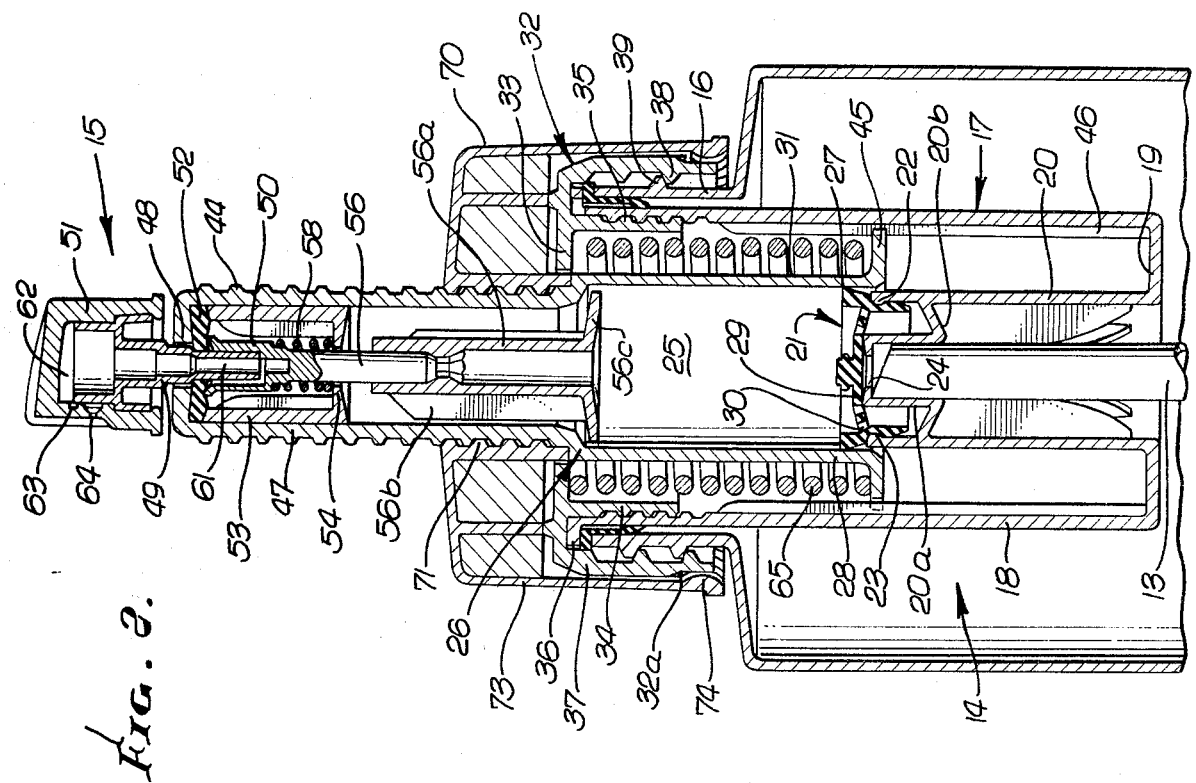

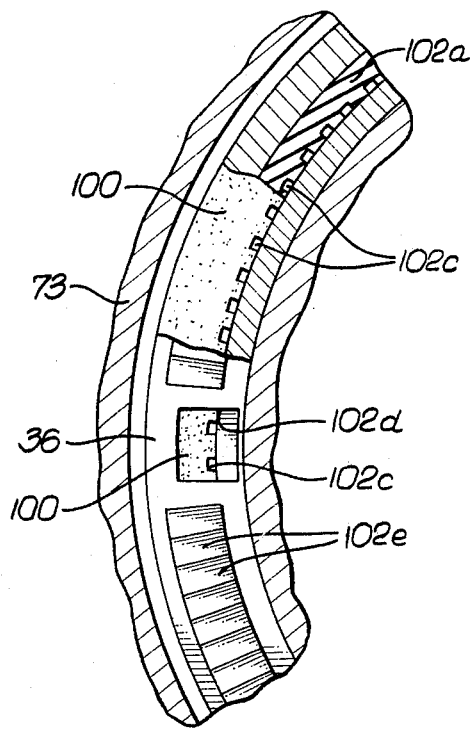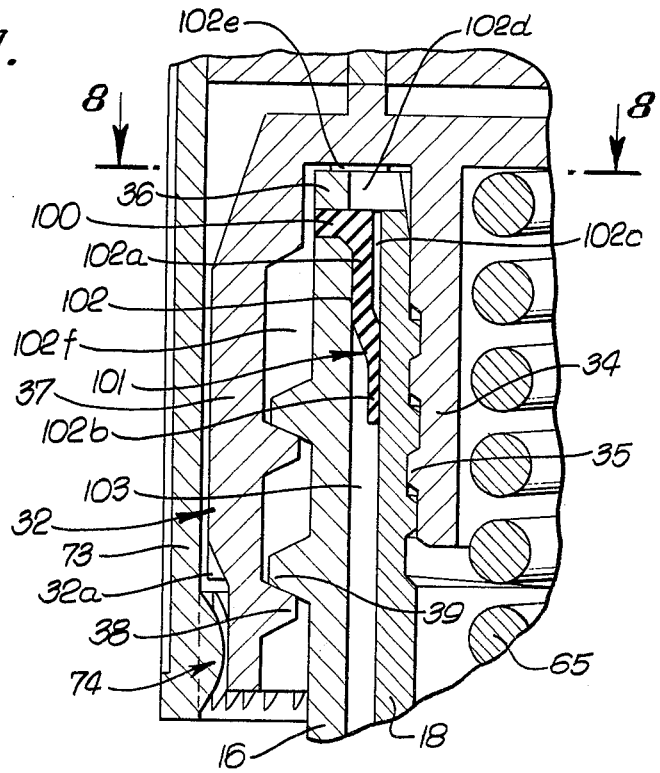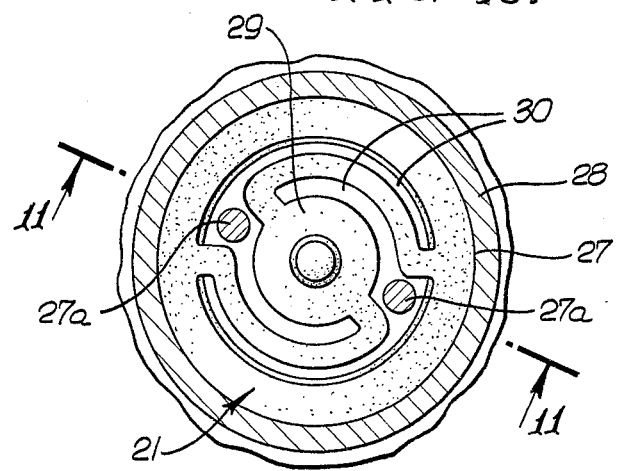

PUMP DEVICES FOR DISPENSING FLUIDS

The present invention relates to devices for dispensing fluids from containers, and more particularly to pump devices adapted to be mounted on containers for dispensing fluids therefrom without the necessity for employing an aerosol propellant.

In my United States patent application, Ser. No. 752,105, filed Dec. 20, 1976, now U.S. Pat. No. 4,147,280, a pump device is disclosed which is mounted on a container for a fluid. The pump device includes a housing structure mounted within and secured to the upper portion of the container and along which a hollow cylinder structure is slidable axially. The inner wall of the cylinder structure is in slidable sealing relation with a piston or head, which may be fixed to or formed as part of the housing structure, the head being in communication with a suction tube extending into the fluid in the container, for delivering fluid through the head and into the hollow portion of the cylinder structure thereabove, which provides a pump chamber. A check valve prevents return flow of the fluid from the chamber to the suction tube. A compression spring acts between the housing structure and cylinder structure to apply pressure to fluid in the chamber and produce its discharge from the pump device when a dispensing valve mounted on the cylinder structure is opened. The cylinder structure is externally threaded for meshing with an internal thread in a cover or cap capable of enclosing the pump device and its valve, rotation of the cover on the cylinder structure to its fullest downward extent shifting the cylinder structure axially in the housing to compress the spring to its fullest extent.

In my application, Ser. No. 665,902, filed Mar. 11, 1976, now U.S. Pat. No. 4,155,485, the actuator is threadedly meshed with the cylinder structure of the device to enable the actuator to be rotated for the purpose of energizing the spring, the actuator remaining meshed with the cylinder structure without interfering with subsequent expansion of the spring in its movement of the cylinder structure, to maintain pressure on the fluid in the pump device. The spring actuator is swivelly mounted with respect to the pump device container to prevent its axial movement relative to the container, while permitting its rotation to axially feed the cylinder structure relative to the container and effect recompression of the spring. A steeply pitched threaded connection is provided between the spring actuator and cylinder structure to cause the axial movement of the cylinder structure, in response to the force of the spring, to freely reversely rotate the actuator, because of its swivel mounting with respect to the pump device and container.

In the pump device disclosed in application Ser. No. 665,902, its piston is mounted in the housing in such manner that the pressure in the pump chamber may tend to expand a portion of the piston from sealing relation to the housing, thereby permitting pressurized liquid in the pump chamber to be dissipated. In addition, as the compressed pump spring expands during discharge of the pressurized liquid from the pump chamber, and reaches the end of its stroke, liquids may not be sprayed from the pump discharge nozzle; but will dribble from the nozzle, which is not desirable. In prior pump devices, ambient air may enter into the container, to prevent a vacuum condition from developing in the container which interfers with the proper supply of container liquid to the pump chamber during the suction stroke of the cylinder structure relative to the piston. However, liquid might leak from the container to its exterior through the same passage that permitted the ambient air from entering the container.

The embodiment of the invention illustrated in the drawings prevents leakage from occurring between an elastomeric piston and the housing to which it is secured, by piloting a portion of the piston within a surrounding housing portion in such manner that the liquid pressure within the pump chamber acts on the interior of the piston and forces and holds it outwardly in firm sealing engagement with the housing portion.

A further feature of the invention is to prevent dribbling of the liquid in the pump chamber through the pump spray nozzle by causing the spring to effect closing of the discharge valve just before the spring reaches the end of its expansion stroke. More specifically, an extension of the discharge valve head engages a suitable stop member just before the spring has been fully expanded, further expansion of the spring bringing the discharge valve seat into sealing engagement with its companion valve head. In a more limited sense, the discharge valve is mounted on the movable cylinder structure, the last increment of movement of the cylinder structure not only resulting in bringing the valve head to a stop, but also moving the valve seat into valve closing engagement with the valve head.

Yet another objective of the invention is to provide an improved one-way or check valve between the exterior of the pump device mounted in the liquid container and the interior of the container to permit ambient air to enter the container as liquid is withdrawn therefrom, thereby preventing a vacuum condition from developing in the container, the check valve closing to prevent liquid in the container from leaking to its exterior.

This invention possesses many other advantages, and has other objectives which may be made more clearly apparent from a consideration of several forms in which it may be embodied. Such forms are shown in the drawings accompanying and forming part of the present specification, and will now be described in detail for the purpose of illustrating the general principles of the invention; but is to be understood that such detailed description is not to be taken in a limiting sense. Referring to the drawings:

FIG. 1 is a side elevational view, with a portion broken away, of a bottle or container and a dispensing pump device mounted therein;

FIG. 2 is a longitudinal section, on an enlarged scale, of the upper portion of the container and pump device taken along the line 2—2 of FIG. 1, disclosing the spring, which effects pressurizing of fluid in the pump device, in its fully compressed condition;

FIG. 3 is a view similar to FIG. 2, disclosing the spring partially expanded and the dispensing valve in an opened condition for spraying a portion of the liquid from the apparatus which embodies an anti-dribble feature;

FIG. 5 is an enlarged longitudinal section through the dispensing valve of the apparatus in its closed condition;

FIG. 6 is a view similar to FIG. 5, disclosing the dispensing valve in its open condition;

FIG. 7 is an enlarged fragmentary section through the upper portion of the container, disclosing a check valve mechanism which permits ambient air to enter the container, but which prevents the container liquid from leaking from the container;

FIG. 8 is a fragmentary cross-section taken along the lines 8—8 on FIG. 7;

FIG. 10 is an enlarged cross-section taken along the line 10—10 of FIG. 9;

FIG. 12 is a cross-section taken along the line 12—12 on FIG. 5;

Figure 4:
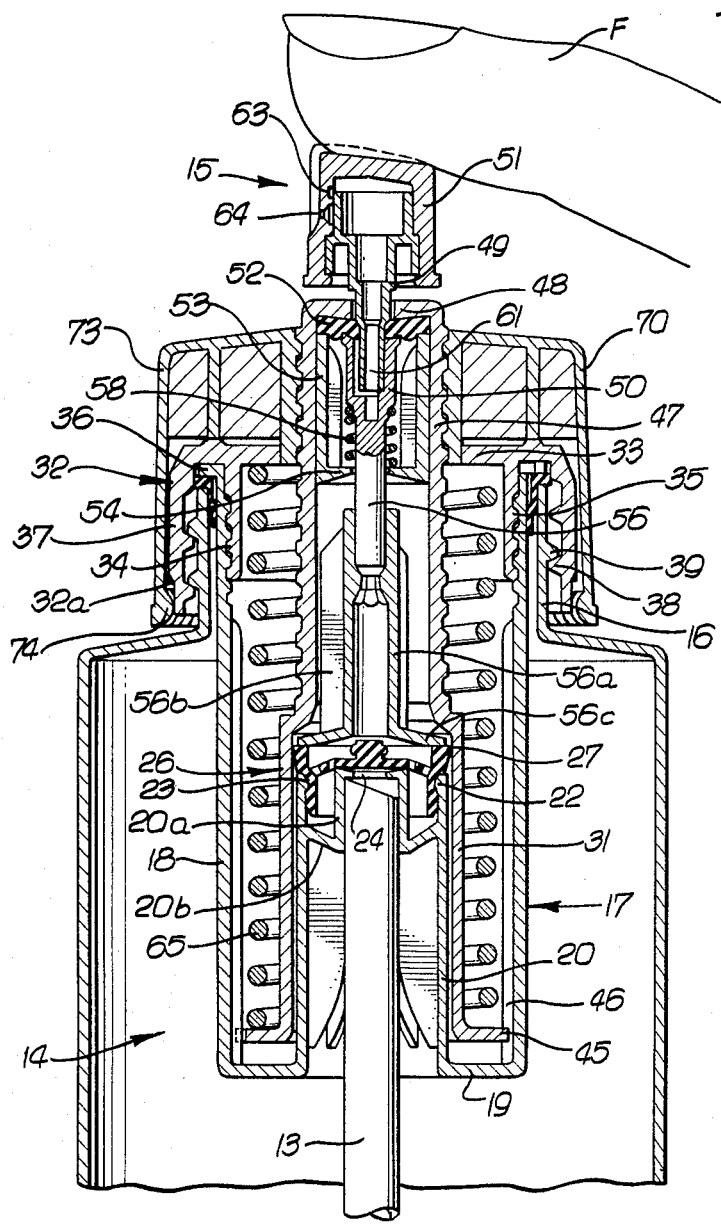
FIG. 4 is a view similar to FIGS. 2 and 3, disclosing the spring fully expanded and the dispensing valve in a fully closed condition.

As disclosed in the drawings, a bottle or container 10 for fluids, such as hair sprays, deodorants, perfumes, and the like, has its bottom portion 11 preferably concave, in order that the inlet end 12 of a dip or suction tube 13 can be disposed adjacent the lower end of the container wall, for the purpose of conducting liquid in the container upwardly to a pump device 14 suitably mounted on the container, a dispensing valve 15 being mounted on the upper portion of the pump device for the purpose of discharging a portion of the liquid under pressure in the pump device, preferably in a spray pattern.

As disclosed in FIGS. 2 to 4, the container has an upper neck 16 of substantially smaller diameter than the main body of the container itself through which the pump device 14 is mounted and into which the pump device is secured. The pump device includes a cylindrical housing 17 having an outer wall 18 merging into an annular bottom 19 which, in turn, merges into an inner wall 20 extending in spaced relation to the outer wall. This inner wall extends upwardly to a desired extent and has a suitable elastomeric piston or head 21 mounted in its upper end, as by means of an inner rib 22 on the inner wall extending into a companion peripheral groove 23 in the head. The upper portion of the suction tube 13 extends within and is suitably fixed to a socket 20a spaced from the inner wall 20 and secured thereto by an intervening web 20b. The suction tube 13 is capable of conducting fluid through an axial port 24 in the socket and into a pump chamber 25 provided by a cylinder structure 26 mounted within and axially movable along the housing 17 and head 21, in the manner described below.

The head 21 has an upwardly extending outer lip seal 27 sealingly engaged against the inner wall 28 of the piston structure, the head also having a central seal 29 adapted to move downwardly into engagement with the seat or socket 20a to close the port 24. When a subatmospheric pressure is developed within the pump chamber 25, the liquid within the container will be sucked upwardly through the suction or dip tube 13, elevating the central seal 29 from its valve seat 20a to permit fluids to pass through the port and passages 30 in the head 21 into the pump chamber 25. Return flow of fluid from the pump chamber is prevented by the inner seal portion 29 moving downwardly into sealing engagement with the valve seat 20a, and also by the outer lip seal 27 bearing against the inner wall of the lower portion 31 of the cylinder structure 26.

The housing 17 is firmly secured to the container neck 16 by a cap or clamp nut 32. This cap includes a transverse base portion 33 from which an inner skirt 34 depends into the upper portion of the outer wall 18, the inner skirt having peripheral threads 35 thereon adapted to mesh with companion circumferential threads in the outer wall 18 for the purpose of securing the cap 32 and housing 17 together. The inner skirt is moved inwardly into the outer wall to its fullest extent as determined by engagement of an outwardly directed flange 36 at the upper end of the outer wall with the transverse portion 33 of the cap.

The flange portion 100 of an elastomeric check valve member 101 is clamped between the flange 36 and the upper end of the neck 16 (FIGS. 7, 8), a sleeve portion 102 of the check valve being disposed in the annular space 103 between the outer wall 18 and the neck 16. The upper portion 102a of the sleeve is disposed between the periphery of the outer wall 18 and the inner wall of the neck 16, the lower portion 102b of the sleeve being sealingly engageable with the periphery of the wall 18. The lower portion 102b is normally spaced from the inner wall of the neck 16 to permit such lower portion to flex outwardly from sealing engagement with the periphery of the wall 18.

As the liquid is sucked upwardly through the suction tube 13 into the pump chamber 25, as described hereinbelow, the pressure in the container decreases below atmospheric. Ambient air is permitted to enter into the container to restore the pressure therewithin to substantially atmospheric. As disclosed in the drawings, the upper sleeve portion 102a is thicker than the lower sleeve portion 102b, the upper portion being close to and between the outer wall 18 of the housing and the inner wall of the container neck 16. The inner surface of the upper portion is interrupted by a plurality of longitudinal grooves 102c opening through the upper end of the upper sleeve portion and communicating with an opening 102d in the wall flange 36, that communicates with a passage between the threads 35 and 71.

The lower sleeve portion 102b is substantially thinner than the upper portion and inherently tends to contract and sealingly engage the periphery of the outer wall 18 to prevent liquid from flowing in the container and through the annular passage 103 past the check valve. However, suction created within the container caused by the upward movement of the cylinder structure 26 with respect to the piston 21 is sufficient to cause the outside atmospheric air to enter through the passages or grooves 102c and deflect the lower sleeve portion 102b outwardly from engaging with the periphery of the outer wall 18, permitting the air to flow into the container. As the air pressure in the container returns to substantially atmospheric, the lower portion 102b in the sleeve valve contracts into full circumferential sealing engagement with the periphery of the outer wall 18, thereby preventing liquid from inadvertently leaking from the container.

The cap 32 includes an outer skirt 37 having internal threads 38 adapted to mesh with companion external threads 39 on the container neck 16, so that the insertion of the pump device 14 and its outer wall 18 through the neck and into the container can be followed by rotation of the cap 32 for the purpose of threading it on the neck 16 and clamping the housing flange 36 between the upper end of the neck and the base portion 33 of the cap. Unthreading of the cap from the neck will permit the entire pump mechanism 14 to be removed, allowing the container to be refilled with liquid through the open neck. The pump device can then be remounted through the neck, and the cap rethreaded on the neck for the purpose of firmly securing the housing 17 and container to one another.

The cylinder structure 26 includes the lower portion 31 disposed within the housing and which has the inner wall 28 against which the outer lip 27 seals, this lower portion terminating in a lower outwardly directed flange 45 extending substantially to the outer wall 18 of the housing. The outer wall has internal longitudinal splines 46 extending into companion slots in the lower cylinder flange 45 to provide a slidable spline connection between the cylinder structure 26 and the housing 17. This arrangement prevents relative rotation between the parts 26, 17, but permits the cylinder structure to shift axially within the housing and along the head 21 secured to the upper portion of the inner wall 20.

The cylinder structure 26 also includes an upper portion 47 which projects upwardly beyond the container and which provides the cylinder chamber 25 in conjunction with the lower cylinder portion 31. The upper portion carries the dispensing valve 15, which, as illustrated, is capable of being actuated by a person's finger F. As disclosed, an upper cylinder head 48 is integral with the upper portion 47, extending inwardly towards an upper hollow valve stem 49 piloted within and projecting upwardly from a valve head 50 located below the cylinder head 48, the valve stem extending upwardly beyond the head 48 and being disposed within and secured to a finger operated actuator 51. A suitable gasket or flexible seat 52 is clamped between the cylinder head 48 and a sleeve 53 suitably attached to the inner wall of the upper cylinder portion 47, this sleeve terminating in a lower inwardly directed spring seat 54. The spring seat is spaced from a depending head extension 56, providing a square space 57 through which fluid from the chamber can flow into the sleeve 53, the sides of the square engaging the extension 56 and centering it in the seat 54 (FIG. 12).

A helical compression spring 58 bears against the seat 54 and engages the valve head 50, urging it upwardly into sealing engagement with the gasket 52 to prevent discharge of fluid under pressure from the pump chamber 25. When the finger operated actuator 51 is depressed, the valve head 50 is removed from contact with the gasket 52, allowing the fluid under pressure to pass through the sleeve 53 into a passage 59 in the valve head 50, which communicates with a passage 61 in the stem 49, that opens at its upper end into a space 62 within the finger operated actuator 51, there being sufficient clearance between the stem and the actuator for the fluid to flow into a passage 63 in the actuator and into a small discharge nozzle or port 64 in the actuator, emerging from the latter as a liquid spray.

It will be noted that the valve stem 49 has a bevelled surface 49a disposed above the gasket 52 when the valve is in closed position, as shown in FIG. 5, and that the upper portion of the valve head 50 is flared outwardly to provide a circumferential edge 50a adapted to engage the lower side of the gasket when the valve is in its closed position. Upon depressing the finger operated actuator 51, the valve head 50 is removed from engagement with the gasket 52 (FIG. 6) and the tapered surface 49a of the valve stem engages the valve seat 52 and deflects it in the downward direction shown in FIG. 6. At this time, the inner portion of the gasket is sealed against the tapered surface 49a of the valve stem 49, preventing fluid from leaking between the gasket 52 and the valve stem 49 through the clearance space that might exist between the stem 49 and the cylinder head 48. When the valve head 50 engages its seat 52, as shown in FIG. 5, the fluid within the sleeve 53 cannot pass between the gasket and head. When the valve is in its open condition, the sealing engagement of the tapered surface 49a of the stem 49 with the gasket 52 prevents fluid from passing in an upward direction around the stem and past the cylinder head 48.

A helical compression spring 65 is disposed around and between the lower portion 31 of the cylinder structure and the outer wall 18 of the cylindrical housing, the upper end of this spring bearing against the base 33 of the cap and the lower end against the cylinder flange 45, the spring tending to shift the cylinder structure 26 downwardly within the housing 17, thereby imposing pressure upon the liquid in the chamber 25. The spring 65 will expand whenever the dispensing valve 15 is opened, the downward movement of the cylinder structure 26 along the head 21 decreasing the effective volume of the chamber, to maintain the liquid in the pump chamber under pressure. When the valve 15 is closed under the action of the valve spring 58, further expansion of the compression spring 65 is prevented.

The spring 65 is compressed by elevating the cylinder structure 26 within the cylindrical housing 17. A spring actuator 70, in the form of a captive nut, is provided which has an internally threaded portion 71 meshing with the external threads 44 on the upper portion 47 of the cylinder structure 26. The actuator 70 is above the base 33 of the cap 32, merging into an outer skirt portion 73 encompassing the cap, and which terminates in an inwardly directed clutch rib 74 underlying a lower clutch shoulder 32a of the cap. The captive nut 70 is capable of rotating to effect its threading action with respect to the cylinder structure 26, but it only has limited axial movement relative to the cap and the container because such axial movement is restricted by engagement of the captive nut with the base 33 of the cap 32 and by the clutch rib 74 which extends under and closely adjacent to the cap shoulder 32a. Thus, a swivel connection is provided between the captive nut 70 and the container 10 and housing 17, so that rotation of the cap, or other actuator, in the proper direction to the right will, because of the threaded interconnection between the actuator 70 and the cylinder structure 26, effect upward movement of the cylinder structure within the housing 17 to compress the spring 65. As the cylinder structure moves upwardly along the stationary head 21, the effective volume of the pump chamber 25 increases to create a subatmospheric pressure therein, causing the liquid in the container to be sucked up the tube 13 past the valve member 29 and into the chamber 25.

To insure the unscrewing of the pump device as a complete unit from the container, the lower rib 74 of the actuator 70 is formed with one-way clutch teeth 74a, normally disposed below companion one-way clutch teeth 32b on the lower shoulder 32a of the cap 32. These clutch teeth are disengaged from each other when the actuator is bearing against base 33 of the cap 32, to enable the actuator to be rotated to the right for the purpose of elevating the cylinder structure 26 and effect energization of the spring 65. The clutch teeth will remain in a disengaged position during expansion of the spring, since the spring force is acting downwardly on the cylinder structure and tends to maintain the actuator 70 in its downward position engaged with the base 33 of the cap 32. Thus, the actuator is free to swivel with respect to the cap 32 and cylinder structure when the actuator is turned to the right for the purpose of compressing the spring, and it is also free to swivel as a result of downward movement of the cylinder structure as the spring expands during the dispensing of fluid through the valve 15.

When it is desired to remove the pump device completely from the container, the actuator 70 is rotated to the left, the actuator threading upwardly to a slight extent along the cylinder structure 26 and shifting the actuator clutch teeth 74a into mesh with the cap clutch teeth 32b. Continued left-hand turning of the actuator will effect complete unscrewing of the cap from the upper neck 16 of the cylinder, enabling the pump device to be removable as a unit together with the cap relative to the container 10.

When the dispensing valve 15 is shifted to an open position, the compressed spring 65 is continuously urging the cylinder structure 26 downwardly to maintain the pressure force of the cylinder structure on the liquid, enabling the dispensing of the liquid from the discharge nozzle 64 to continue. Closing of the dispensing valve causes immediate cessation of the downward movement of the cylinder structure.

The captive nut or spring actuator 70 cannot move axially, as noted above. However, it is free to rotate or free-wheel during the dispensing of liquid from the apparatus since the interengaging threads 44 and 71 are steeply pitched, for example, at an angle of 37°. Accordingly, longitudinal extension of the spring 65 can shift the cylinder structure 26 downwardly and without rotation, the captive nut 70 merely free-wheeling or rotating in a reverse direction opposite to the direction of its turning in compressing the spring 65. The spring can shift the cylinder structure downwardly in the container to a predetermined extent, as described hereinbelow, at which the flange 45 is still elevated from the bottom 19 of the annular housing 17 by a small extent.

At any time, a person need merely grasp the captive nut 70 and rotate it to the right, to produce the upward feeding of the cylinder structure 26 with respect to the container 10 and recompression of the spring 65 to its fullest extent, or, if desired, to only a partial extent.

It is apparent that the threaded relationship between the captive nut 70 and cylinder structure 26 can be maintained at all times, which facilitates recompression of the spring whenever desired merely by rotating the captive nut, but which does not prevent expansion of the spring as a result of dispensing fluid from the apparatus.

The captive nut 70 of the apparatus can be disassembled from the container cap 32 and reassembled thereon, as permitted by the elasticity of the materials of which the parts are made. As discussed above, the cap 32 can be unthreaded from the neck 16 of the bottle or container 10 to remove the entire pump device 17 therefrom and permit refilling of the bottle or container.

In prior pump devices for dispensing fluids, it is found that the nozzle dribbles when the cylinder 26 reaches the lower end of its pressurizing stroke within the housing 17. Prior to the cylinder reaching such lowermost position, the spring 65 is exerting sufficient force on the cylinder to maintain pressure on the liquid in the cylinder chamber 25, so that the fluid emanates from the nozzle port 64 in a fine spray. However, in prior devices, when the spring has expanded downwardly to its fullest extent, as determined by engagement of the lower flange 45 with the annular bottom 19 of the housing 17, no further spring force is exerted on the cylinder, and the latter can no longer maintain the liquid in the cylinder under pressure. Upon bottoming of the cylinder against the housing portion 19, the spray pattern no longer exists, a small quantity of liquid dribbling out through the nozzle 64.

The above-noted dribbling difficulty is overcome in the pump devices illustrated in the drawings by preventing the cylinder 26 from bottoming out against the housing at the end of the cylinder stroke. As specifically shown in FIGS. 2 to 4, a stop member 56a is secured to the extension 56, as by piloting and frictionally securing the latter within the upper portion of the stop member. The stop member 56a has circumferentially spaced longitudinally extending radial ribs 56b for centering it in the upper portion 47 of the cylinder, terminating in a limit head 56c which will engage the upper lip portion 27 of the piston 21 as the cylinder nears the lowermost end of its stroke (see FIG. 4). Upon engagement of the limit head with the piston, the stop member 56a, and the extension 56 and head 50 secured thereto, are prevented from moving downwardly to any further extent, the spring continuing to expand and shift the cylinder 26 downwardly to a slight extent sufficient to reengage the gasket 52 with the valve head 50 and effectively closing the discharge valve 15. The valve opening force exerted by the person's finger is transmitted directly through the interconnected actuator 51, hollow valve stem 49, valve head 50, extension 56, and the stop member 56a, which receives and is secured to the extension 56. The last short distance of downward travel of the cylinder 26, under the influence of the helical compression spring 65, moves the gasket 52 with it and into sealing engagement with the valve head 50. The closing of the discharge valve in the manner described above prevents any further discharge of liquid through the nozzle 64 and eliminates the undesirable dribble effect attending prior fluid dispensing units.

Figure 9:
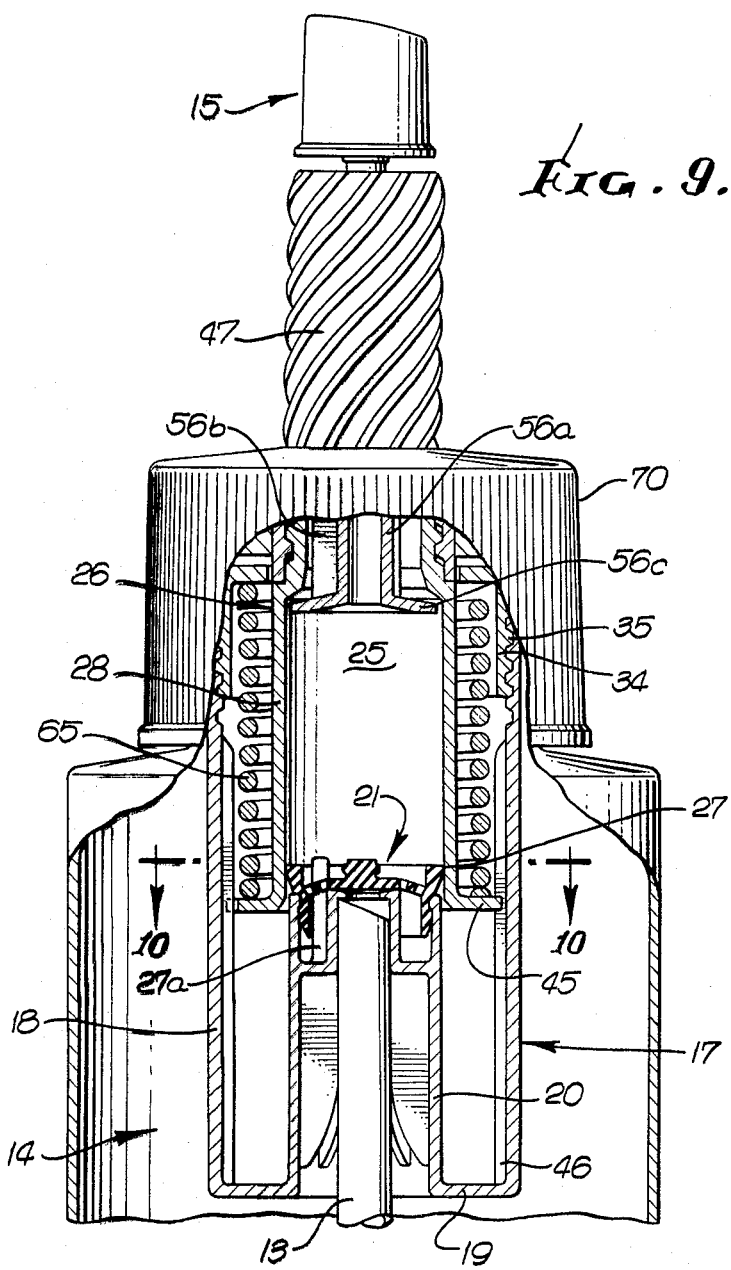
FIG. 9 is a combined side elevational and sectional view through a modified form of the apparatus, the anti-dribble feature being specifically different from the one disclosed in FIGS. 2, 3 and 4.

In lieu of the stop member 56a coming to rest upon the piston 21, as disclosed in FIG. 4, such stop member can be caused to come to rest against one or more stop pins 27a (FIGS. 9, 10 and 11) integral with or suitably secured to the housing 17. More specifically, as shown in the FIGS. 9 to 11 embodiment, the pins 27a are integral with the intervening web 20b and extend upwardly through the piston 21 and through openings or ports 30 disposed around the central seal portion 29 of the piston, the stop pins projecting above the lip portion 27 of the elastomeric piston 21.

Figure 11:
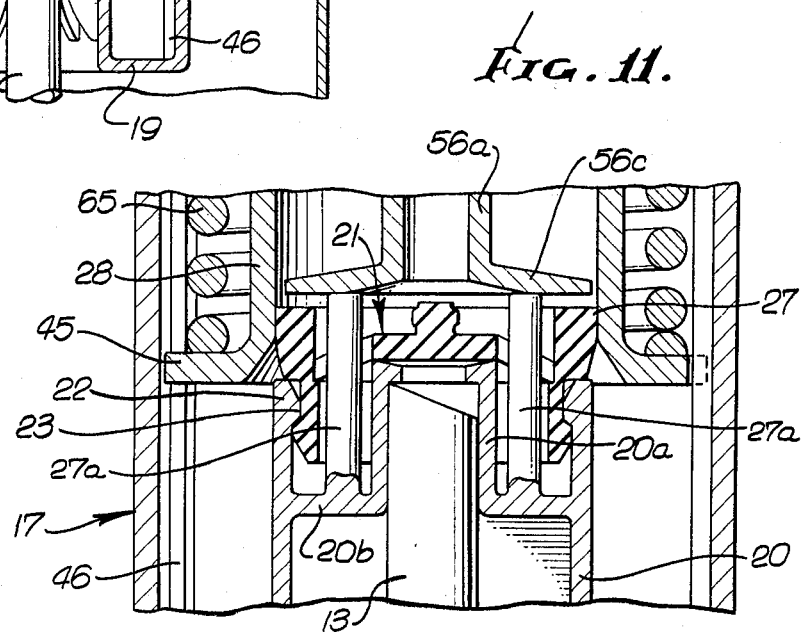
FIG. 11 is a section taken along the line 11—11 on FIG. 10.
Figure 13:
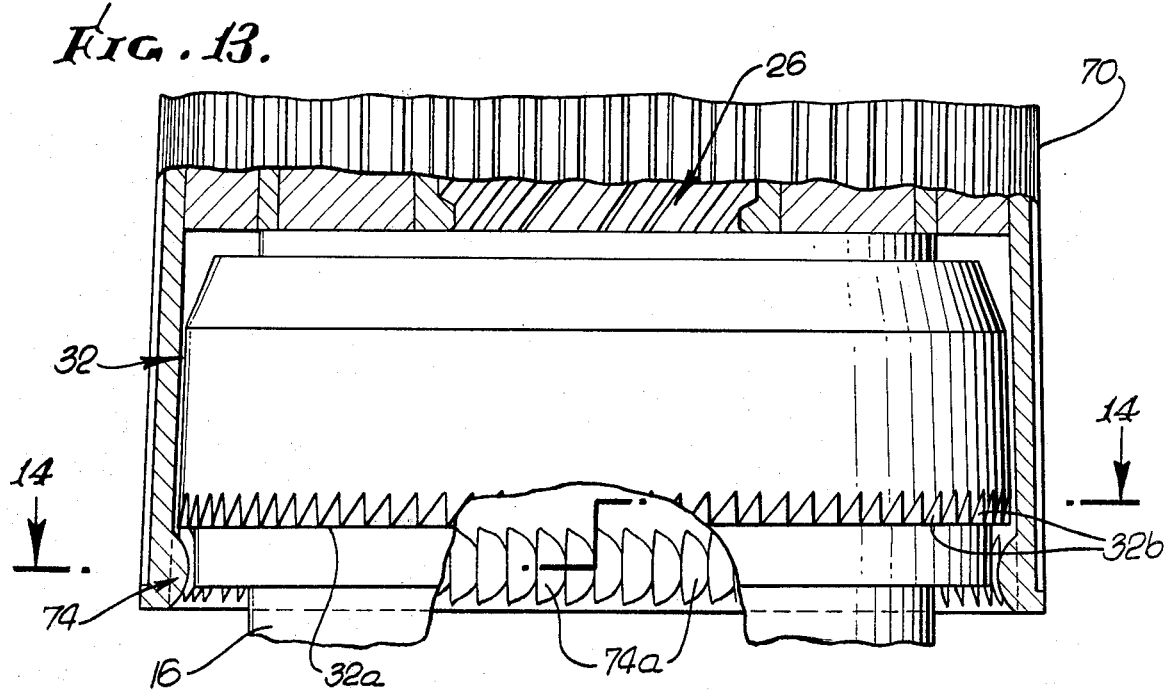
FIG. 13 is a combined side elevational and sectional view, on an enlarged scale, through part of the apparatus disclosed in FIG. 2, with a portion broken away.
Figure 14:
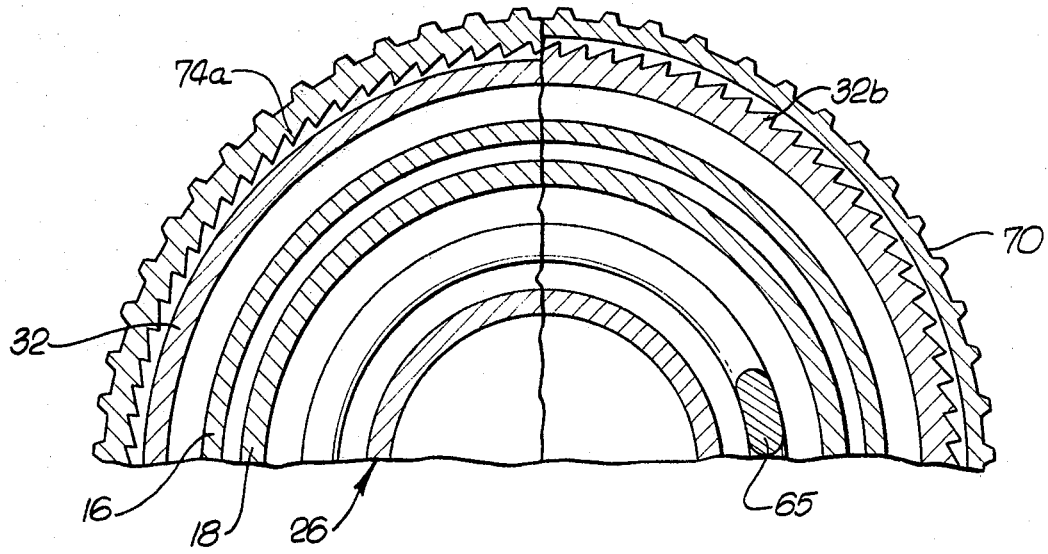
FIG. 14 is a cross-section taken along the line 14—14 on FIG. 13.

As the cylinder 26 nears the lower end of its stroke, the limit head 56c engages the upper end of the pins, as shown in FIG. 11, to preclude further downward movement of the interconnected structure 56a, 56, 50, 49 and 51, the cylinder portion 47 and its cylinder head 48 continuing to move downwardly relative to the housing under the influence of the compression spring 65, to shift the gasket 52 and the sleeve 53 downwardly of the valve stem 49 to clamp the gasket or seat 52 between the upper end of the valve head 50 and the cylinder head 48, which is the same position as shown in the apparatus of FIG. 4.

With the stop pin arrangement, assurance is had that the valve head 50 is brought to rest at a predetermined and fixed location with respect to the housing, despite repeated reengagement of the limit head 56c with the pins 27a. This arrangement appears to be preferable to the one disclosed in FIGS. 2 to 4, in which the limit head 56c may deform the elastomeric piston 21 as a result of repeated enggements of the valve head therewith, the valve head 50 shifting downwardly to a slightly lower position within the housing than it initially occupied, requiring that the spring 65 expand to a slightly greater extent for the purpose of reclosing the discharge valve. The stop arrangement illustrated in FIGS. 2 to 4 is fully operable, the pin arrangement of FIGS. 9 to 11 potentially having a longer useful life than the arrangement shown in FIGS. 2 to 4.

I claim:

1. A fluid dispensing device, comprising a container for the fluid, pump means mounted in said container and including a housing fixed with respect to said container, a cylinder in said housing shiftable with respect to said housing, said cylinder having a pump chamber therein, said pump means further including an elastomeric piston fixed to said housing and disposed in said chamber in slidable sealed relation to said cylinder, a first valve means permitting fluid flow from said container into said chamber, but preventing reverse fluid flow, spring means for shifting said cylinder and its chamber in one direction with respect to said piston to cause said cylinder to apply pressure to fluid in said chamber, a second valve means permitting discharge of pressurized fluid from said pump chamber in response to shifting of said cylinder and its chamber in said one direction by said spring means, said housing having a portion embracing a skirt portion of said piston, said skirt portion being subject to the pressure of fluid in said chamber to urge and hold said skirt portion outwardly in firm sealing engagement with said housing portion.

2. A device as defined in claim 1; said skirt portion having an external circumferential groove, said housing portion being an internal circumferential rib disposed in said groove.

3. A device as defined in claims 1 or 2; said piston having a lip seal sealingly engaging the inner wall of said cylinder.

4. A device as defined in claims 1 or 2; said first valve means including a ported valve seat in said housing through which fluid can flow from said container into said chamber, said first valve means further including a central portion of said elastomeric piston movable into and from engagement with said seat.

5. A fluid dispensing device, comprising a container for the fluid, pump means mounted in said container, said pump means including a cylinder structure having a pump chamber therein and a piston structure relatively slidable in said cylinder structure, resilient means for shifting one of said structures in one direction relative to said other structure to apply fluid pressure to fluid in said chamber, a first valve means permitting fluid flow from said container into said chamber, but preventing reverse fluid flow, means for shifting said one of said structures in the opposite direction to energize said resilient means, a second valve means operable to permit discharge of pressurized fluid from said pump chamber in response to shifting of said one of said structures in said one direction, and means operable in response to movement in said one direction of said one of said structures for closing said second valve means as said one of said structures nears the end of its pressurizing stroke.

6. A device as defined in claim 5; said means for closing said second valve means comprising stop means engaged by said second valve means as said one of said structures nears the end of its pressurizing stroke to effect closing of said second valve means.

7. A device as defined in claim 5; said second valve means including a valve head member and a companion valve seat member, one of said members being connected to said one of said structures, said means for closing said second valve means comprising stop means engaged by said other of said members as said one of said structures nears the end of its stroke to close said second valve means.

8. A device as defined in claim 5; said second valve means being movable with said one of said structures, said second valve means including a valve head and a companion valve seat movable realtive to said valve head to open and close said second valve means, said valve seat being secured to said one of said structures, said means for closing said second valve means comprising stop means engaged by said valve head to arrest movement of said valve head and permit continued movement of said one of said structures in said one direction to shift said valve seat into engagement with said valve head to close said second valve means.

9. A device as defined in claims 5, 7 or 8; said one of said structures being said cylinder structure, said other structure being said piston structure.

10. A fluid dispensing device, comprising a container for the fluid, pump means mounted in said container including a housing fixed to said container, a cylinder in said housing shiftable with respect to said housing in said container, said cylinder having a pump chamber therein, said pump means further including a piston fixed in said container and disposed in said chamber in slidable sealed relation to said chamber, spring means in said housing bearing against said cylinder to shift said cylinder and its chamber in one direction with respect to said piston to cause said cylinder to apply pressure to fluid in said chamber, a first valve means permitting fluid flow from said container into the lower end of said chamber, but preventing reverse fluid flow, a second valve means movable with said cylinder and permitting discharge of pressurized fluid from said pump chamber and through said cylinder in response to shifting of said cylinder and its chamber in said one direction by said spring means, said second valve means including a valve head structure and a companion valve seat structure movable with respect to said head structure to open and close said second valve means, said seat structure being secured to said cylinder, and stop means engaged by said valve head structure to arrest movement of said valve head structure and permit continued movement of said cylinder in said one direction to shift said valve seat structure into engagement with said valve head structure to close said second valve means.

11. A device as defined in claim 10; said stop means comprising said piston.

12. A device as defined in claim 10; said stop means comprising one or more stop elements fixed to said housing and engaged by said valve head structure.

13. A device as defined in claim 12; said one or more stop elements including one or more pins extending longitudinally through said piston.

14. A fluid dispensing device, comprising a container member for the fluid, pump means in said container member including a housing member, a piston in said housing member, and a cylinder in said housing member having a pump chamber therein, spring means for moving said piston and cylinder with respect to each other to apply pressure to fluid in said chamber, first valve means permitting fluid flow from said container member into said chamber, but preventing reverse fluid flow, second valve means permitting discharge of pressurized fluid from said pump chamber in response to relative movement between said piston and cylinder, and one-way check valve means including an annular elastomeric sleeve disposed in an annular space between said container member and housing member, means for securing one portion of said sleeve to said container member, said elastomeric sleeve having a thick portion disposed between and simultaneously engaging the opposed cylindrical walls of said container member and housing member and provided with a plurality of longitudinal grooves facing said housing member and through which ambient air can flow, said sleeve further including a circumferentially continuous thinner portion adjacent said thick portion sealingly engaging said housing member, said thinner portion being deflectable from sealing engagement with said housing member by the ambient air upon subatmospheric pressure being present in said container member.

* * * * *